UNITED STATES PATENT OFFICE.

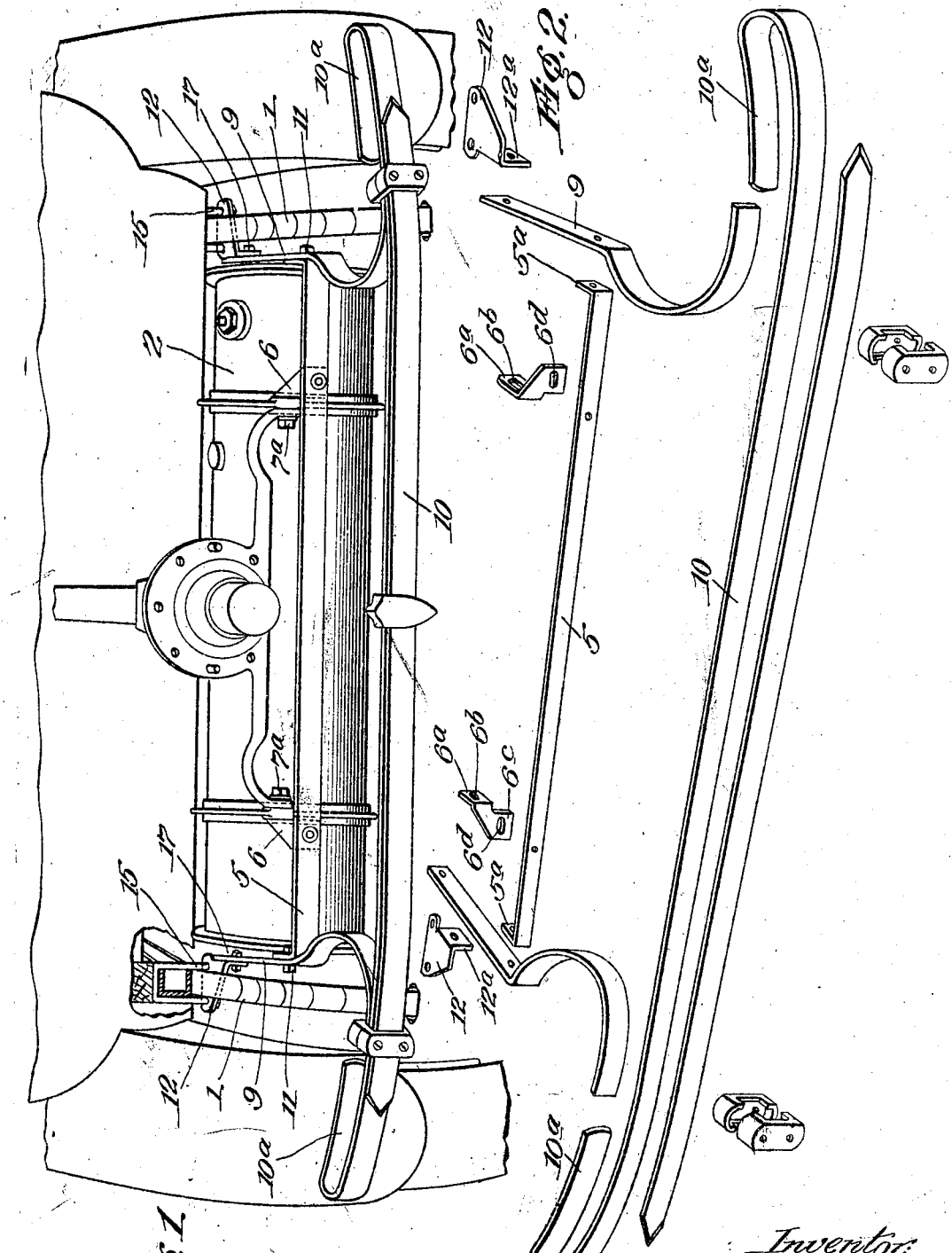

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

REAR BUMPER FOR AUTOMOBILES.

1,379,791.                    Specification of Letters Patent.      Patented May 31, 1921.

Application filed December 14, 1920. Serial No. 430,878.

*To all whom it may concern:*

Be it known that I, FREDERIK G. WHITTINGTON, a citizen of the United States, and a resident of the city of Chicago, in the county of Cook and State of Illinois, have invented certain new and useful Improvements in Rear Bumpers for Automobiles, of which the following is a specification, reference being had to the accompanying drawings, forming a part thereof.

The purpose of this invention is to provide an improved construction for mounting a rear bumper upon an automobile, taking advantage of the rear tank mounted thereon and the side springs for the purpose of securing the bumper. It consists in the elements and features of construction shown and described as indicated in the claims.

In the drawings:—

Figure 1 is a perspective view of the rear portion of the chassis of an automobile equipped with this invention, the rear wheel being partly shown in relation to the bumper.

Fig. 2 is a perspective view showing the several parts of the bumper and its connections dissected.

The automobiles for which the bumper constituting this application is particularly designed have rearwardly exposed side springs and one or more tanks which are mounted between the side springs respectively, and the rigidly fore-and-aft extending portions of the chassis or transmission supports. The present invention takes advantage of these features of construction for mounting and carrying the rear bumper as hereinafter described. In the drawings there is shown one of the side springs, 1, of the vehicle. The tank, 2, is between said side spring carried by encircling supports, 3, to which latter the spare wheel carrier, 4, is made fast in the usual construction of the vehicle. For the purpose of mounting the bumper of this invention there is provided a transversely extending cross-bar or brace, 5, which is secured to the rear side of the tank supports, 3, by means of the fittings, 6, which are rights-and-lefts, each of angle form, having one limb, 6ª, provided with a bolt hole, 6ᵇ, adapted to be engaged by the bolt, 7ª, which secures the spare wheel carrier to the tank support, 8, the bolt being first removed for that purpose and re-inserted through the bolt aperture, 6ᵇ, of said angle fitting and then through the parts through the originally secured parts, the nut being re-applied in the original position as seen at 7ª. The other wing of the fitting, 6ᶜ, has a horizontally-elongated or slotted bolt hole, 6ᵈ, for a bolt, 8ª, which takes through the cross-bar, 5, for securing it to said angle fitting. The end of the cross-bar 5, is flexed rearward beyond the tank,—that is, between the tank and the vehicle side spring,—to form a seat and means of engagement of the cross-bar with the fore-and-aft extending arm, 9, by which the bumper impact bar, 10, is carried, said arm, 9, extending in a fore-and-aft vertical plane between the vehicle side spring, 1, and the adjacent end of the tank, 2, and lapping therein on the inwardly-turned end, 5ª, of the bar, 5, which forms a seat for that purpose, while a bolt 11, is applied for securing the two parts together. Extending farther forward, the arm, 9, is secured at its forward end by means of a shackle device, 12, which is provided for clasping and being secured to the spring, 1, such securement being effected by a U-bolt, 15, taking through proper bolt holes provided in one limb of the said fitting, 12, which has a downwardly-turned lug, 12ª, at its inner end on which the inner end of the bumper supporting arm, 9, laps and to which it is secured by a bolt, 17.

It will be understood that the bumper impact bars, 10, may be of any usual or desired construction being lapped upon and secured to the outwardly-turned rear end of the supporting arm, 9, and having its end loop, 10ª, positioned immediately in the rear of the drive wheel which it is designed to guard.

I claim:—

1. A rear bumper for automobiles comprising in combination with the vehicle side springs and the rear tank, a cross-bar mounted on the tank supports terminating at vertical fore-and-aft planes between the tank ends and the side springs; a fore-and-aft bumper-supporting arm which extends in said plane and abuts on the end of the cross bar, means for securing it thereto, and a shackle device clasping the spring at a point forward of the cross-bar and having a lug on which the forward end of the arm abuts and is secured.

2. In the construction defined in claim 1, foregoing, means for securing the cross-bar to the tank support consisting of a fitting adapted to be applied to the tank support, one wing of the fitting having a bolt-hole adapted for securing it to the tank support, and the other wing having a slotted or elongated bolt hole for securing the cross-bar.

In testimony whereof, I have hereunto set my hand at Chicago, Illinois, this 8th day of Dec., 1920.

FREDERIK G. WHITTINGTON.